United States Patent
Lehan

(10) Patent No.: US 9,804,309 B1
(45) Date of Patent: Oct. 31, 2017

(54) REDUCING EXTRINSIC STRESS IN THIN FILM OPTICAL MIRRORS AND FILTERS FOR DEEP ULTRAVIOLET

(71) Applicant: KLA-TENCOR CORPORATION, Milpitas, CA (US)

(72) Inventor: John Lehan, San Jose, CA (US)

(73) Assignee: KLA-Tencor Corporation, Milpitas, CO (US)

(*) Notice: Subject to any disclaimer, the term of this patent is extended or adjusted under 35 U.S.C. 154(b) by 132 days.

(21) Appl. No.: 14/692,824

(22) Filed: Apr. 22, 2015

Related U.S. Application Data

(60) Provisional application No. 61/982,743, filed on Apr. 22, 2014.

(51) Int. Cl.
| | | |
|---|---|---|
| F21V 9/04 | (2006.01) |
| F21V 9/06 | (2006.01) |
| G02B 5/08 | (2006.01) |
| G02B 5/20 | (2006.01) |
| G02B 5/28 | (2006.01) |
| G02B 1/10 | (2015.01) |

(52) U.S. Cl.
CPC .............. G02B 5/283 (2013.01); G02B 1/10 (2013.01); G02B 5/0816 (2013.01); G02B 5/0891 (2013.01); G02B 5/285 (2013.01)

(58) Field of Classification Search
CPC ....... G02B 1/10–1/115; G02B 5/0816–5/0891; G02B 5/283–5/287; G02B 5/08; G02B 5/085; G02B 5/28; G02B 5/00; G02B 1/00; G02B 1/04; G02B 1/041; G02B 3/0087; G03F 7/70233–7/70958; C03C 2217/40; C03C 2217/91; C03C 2203/00; C03C 2203/10

USPC ....... 359/308, 359, 361, 582, 584, 586, 588, 359/848; 428/212, 421, 422, 446, 473.5, 428/480, 523, 688, 689, 698
See application file for complete search history.

(56) References Cited

U.S. PATENT DOCUMENTS

| | | | | |
|---|---|---|---|---|
| 4,929,065 A | * | 5/1990 | Hagerty | G02B 3/0087 359/653 |
| 5,562,774 A | * | 10/1996 | Breidenbach | B32B 17/06 118/500 |
| 6,011,646 A | * | 1/2000 | Mirkarimi | G02B 1/105 359/359 |
| 2003/0149989 A1 | * | 8/2003 | Hunter | B82Y 10/00 725/89 |
| 2006/0051602 A1 | * | 3/2006 | Iacovangelo | C04B 41/009 428/472 |
| 2009/0212398 A1 | * | 8/2009 | Suzuki | H01L 33/12 257/618 |

FOREIGN PATENT DOCUMENTS

WO   2013155462 A1   10/2013

* cited by examiner

Primary Examiner — Scott J Sugarman
Assistant Examiner — Mustak Choudhury
(74) Attorney, Agent, or Firm — Hodgson Russ LLP

(57) ABSTRACT

A multilayer coating has a substrate, an optical layer, and a buffer layer between the substrate and the optical layer. The buffer layer has a coefficient of thermal expansion between that of the substrate and the optical layer. The multilayer coating has properties that enable its use in deep ultraviolet (DUV) wavelengths, such as for a multilayer mirror or edge filter. This multilayer coating with a buffer layer provides improved thermal stability and lifetime.

19 Claims, 7 Drawing Sheets

REDUCING EXTRINSIC STRESS IN THIN FILM OPTICAL MIRRORS AND FILTERS FOR DEEP ULTRAVIOLET

CROSS-REFERENCE TO RELATED APPLICATIONS

This application claims priority to the provisional patent application assigned U.S. App. No. 61/982,743 filed Apr. 22, 2014, the disclosure of which is hereby incorporated by reference in its entirety.

FIELD OF THE DISCLOSURE

This disclosure relates to multilayer coatings and, more particularly, to multilayer coatings for deep ultraviolet applications.

BACKGROUND OF THE DISCLOSURE

Ultraviolet ("UV") imaging is used for industrial inspection processes. UV light interacts with materials in a manner that enables features and characteristics to be observed that are difficult to detect by other methods. For example, UV light is strongly absorbed by many materials, making it possible to visualize the surface of an object without the light penetrating into the interior.

The UV band spans the range of wavelengths between 10 nm (where the x-ray band begins) to the edge of human visual sensitivity at 400 nm. There are two main classes of industrial UV imaging applications that each use a different band of the UV spectrum. The band of the spectrum between 300 nm and 400 nm is commonly known as the near UV band. It is divided into the UV-A and UV-B sub-bands. The band of the spectrum between 100 nm and 300 nm, which includes the UV-C band, is known as the deep UV (DUV) band.

UV imaging has advantages over visible light. Because of its short wavelength, UV light tends to be scattered by surface features that are not apparent at longer wavelengths. Thus, smaller features can be resolved or detected by scattered UV light. For example, UV imaging can be used to detect scratches or surface imperfections that are not apparent in an image formed using visible light.

DUV applications are growing in importance for nanotechnology and lithography. In the semiconductor industry, inspection of photomasks or wafers with fine lines and features may need to find defects that are submicron in size. Visible light may be unable to resolve features that are so small. Confocal microscopes operating in the DUV band can be used to image these features with much greater clarity than in the visible band. Detection of these defects early in the production process can greatly improve yields and reduce waste.

Multilayer coatings made of layers with different optical properties have proven effective for various DUV applications. However, many multilayer coatings exhibit large residual stress. This is particularly true in DUV where fluoride materials or other materials are used. Some of this stress is extrinsic and caused by a mismatch between the coefficient of thermal expansion (CTE) of the substrate and the multilayer coating. A CTE refers to a material's change in size per change in temperature at a constant pressure. As a material is heated, kinetic energy increases and molecules usually maintain a greater average separation. Mismatches in CTE can lead to fractures or other defects in a multilayer coating due to temperature changes. Therefore, what is needed is an improved multilayer coating.

BRIEF SUMMARY OF THE DISCLOSURE

In a first embodiment, a multilayer coating is provided. The multilayer coating has a substrate, at least one optical layer, and a buffer layer. The substrate has a first coefficient of thermal expansion and a thickness of at least 100 µm. The at least one optical layer has a second coefficient of thermal expansion and a thickness of at least 0.5 µm. The buffer layer is disposed between the substrate and the optical layer. The buffer layer has a third coefficient of thermal expansion having a value between the first coefficient of thermal expansion and the second coefficient of thermal expansion. The buffer layer has a thickness of at least 0.5 µm. The third coefficient of thermal expansion can be greater than the first coefficient of thermal expansion and less than the second coefficient of thermal expansion. The third coefficient of thermal expansion also can be less than the first coefficient of thermal expansion and greater than the second coefficient of thermal expansion.

The thickness of the buffer layer may be at least 1 µm or may be from 2 µm to 4 µm.

The optical layer may include multiple layers in one instance. In this instance, the second coefficient of thermal expansion is an effective coefficient of thermal expansion. A thickness of at least one of the layers of the optical layer is greater than 0.5 µm.

The substrate may include one of a fluoride compound or fused silica. The optical layer may include a fluoride compound. The buffer layer may include one of alumina, silicon oxynitride, or aluminum oxynitride. The buffer layer also may include $SiO_2$ and at least one of $MgF_2$, LiF, $AlF_3$, or $CaF_2$.

The buffer layer may have a gradient of a first material and a second material. A surface of the buffer layer disposed on the substrate may have more of the first material than the second material and a surface of the buffer layer disposed on the optical layer may have more of the second material than the first material. In an instance, the first material is a fluoride compound and the second compound is fused silica.

The buffer layer may have a gradient of a first material and a second material. A surface of the buffer layer disposed on the substrate may have more of the first material than the second material and a surface of the buffer layer disposed on the optical layer may have more of the second material than the first material. In an instance, the first material has a coefficient of thermal expansion closer to the first coefficient of thermal expansion than that of the second material, and the second material has a coefficient of thermal expansion closer to the second coefficient of thermal expansion than that of the first material. The first material and second material may have different refractive indices.

In an instance, the buffer layer includes a first layer of $CaF_2$ and a second layer of $SiO_2$. In this instance, the third coefficient of thermal expansion is an effective coefficient of thermal expansion.

The multilayer coating may be used as a multilayer mirror for deep ultraviolet or an edge filter for deep ultraviolet.

In a second embodiment, a method of manufacturing a multilayer coating is provided. A substrate having a first coefficient of thermal expansion is provided. A thickness of the substrate is at least 100 µm. A buffer layer is applied on the substrate. The buffer layer has a third coefficient of thermal expansion and a thickness of at least 0.5 µm. An optical layer is applied on the buffer layer. The optical layer has a second coefficient of thermal expansion and a thickness of at least 0.5 μm. The third coefficient of thermal expansion has a value between the first coefficient of thermal expansion and the second coefficient of thermal expansion. At least one of the buffer layer or the optical layer may include multiple layers. In this instance, the second coefficient of thermal expansion or third coefficient of thermal expansion is an effective coefficient of thermal expansion.

In a third embodiment, a multilayer coating is provided. The multilayer coating has a substrate, at least one optical layer, and a buffer layer. The substrate has a first coefficient of thermal expansion. The at least one optical layer has a second coefficient of thermal expansion. The buffer layer is disposed between the substrate and the optical layer. The buffer layer has a third coefficient of thermal expansion having a value between the first coefficient of thermal expansion and the second coefficient of thermal expansion.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Multilayer coatings for use in DUV wavelengths from approximately 150 nm to approximately 300 nm are disclosed. This includes wavelengths of, for example, 248 nm, 193 nm, 157 nm, or other wavelengths or ranges of wavelengths used for imaging or inspection. These multilayer coatings include a buffer layer between a substrate and an optical layer. The buffer layer has a CTE between that of the substrate and the optical layer.

The multilayer coatings disclosed herein provide improved thermal stability and lifetime. A larger number of layers can be used in the multilayer coating and greater operating temperatures can be accommodated. Thermal expansion increases with temperature, so a buffer layer can minimize the effects of thermal expansion even at a higher temperature.

Figure 1:
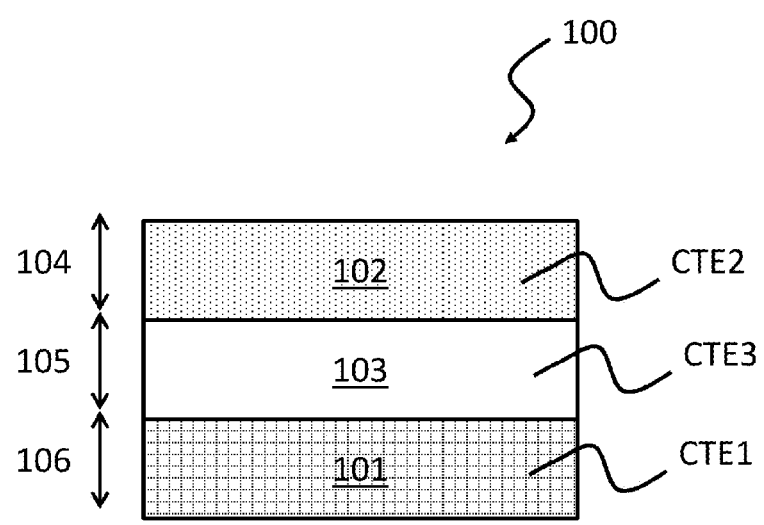
FIG. 1 is a block diagram of a first embodiment of a multilayer coating in accordance with the present disclosure.

FIG. 1 is a block diagram of a first embodiment of a multilayer coating 100. The multilayer coating 100 has a substrate 101, an optical layer 102, and a buffer layer 103. The buffer layer 103 is disposed between the substrate 101 and optical layer 102. Thus, one surface of the buffer layer 103 is disposed on the substrate 101 and another surface of the buffer layer 103 is disposed on the optical layer 102. The substrate 101 has a first coefficient of thermal expansion (CTE1). The optical layer 102 has a second coefficient of thermal expansion (CTE2). The buffer layer 103 between the substrate 101 and optical layer 102 has a third coefficient of thermal expansion (CTE3).

The CTE3 of the buffer layer 103 has a value between the CTE1 of the substrate 101 and the CTE2 of the optical layer 102. The relationship can be CTE2>CTE3>CTE1 or CTE2<CTE3<CTE1.

The substrate 101 can be a fluoride compound, such as $CaF_2$, LiF, $MgF_2$, $AlF_3$, or other metal fluorides. Fluoride materials may be used as optical materials for DUV wavelengths because these materials have a wide band gap that allows UV light to pass directly through with minimized absorption. Fluoride compounds, such as $CaF_2$, LiF, $MgF_2$, $AlF_3$, or other metal fluorides, have a relatively large CTE. For example, $CaF_2$ has a CTE of approximately $2 \times 10^{-5}/°$ C. near room temperature. Thermal stress on $CaF_2$ can cause a multilayer film to fail due to mismatch of the fluoride compound's CTE to the CTE of other materials in the multilayer film.

The substrate 101 also can be fused silica, which is a man-made amorphous form of silica ($SiO_2$). Fused silica has a smaller CTE than $CaF_2$. The CTE for fused silica may be considered near-zero. For example, fused silica has a CTE of approximately $5 \times 10^{-7}/°$ C. near room temperature, though this can vary depending on vendor, hydrogen loading, sample history, or other variables. However, fused silica may have less desirable optical properties than certain fluoride materials. The crystalline state is quartz, which is clear into the vacuum UV but is optically anisotropic. For example, fused silica may absorb more UV light than a fluoride compound. The amorphous state of fused silica is isotropic. Fused silica can have beneficial optical properties in the DUV where its matrix is often loaded with hydrogen to satisfy dangling bonds resulting from non-bridging oxygen atoms resultant from disorder and production process parameters. Nonetheless, fused silica provides mechanical and cost benefits. Fused silica can be stronger or cheaper to manufacture than many fluoride compounds.

The substrate 101 has a thickness 106 of at least 100 μm. For example, the thickness 106 of the substrate 101 can be from 0.3 mm and 25 mm, including all values and ranges therebetween.

The optical layer 102 can be a fluoride compound, such as $CaF_2$. The substrate 101 is made of a different material than the optical layer 102. For example, the substrate 101 may be fused silica, a different fluoride compound, or a different mixture of fluoride compounds than the optical layer 102.

The optical layer 102 has a thickness 104 of at least 0.5 μm. In an instance, the thickness 104 is multiple microns thick. For example, the thickness 104 of the optical layer 102 can be from 0.5 μm and 4 μm, including all values and ranges therebetween.

Absorption of the buffer layer 103 depends on the application. For a mirror, the buffer layer 103 can absorb because the film reflects the light. Absorption may be an advantage in some applications if the buffer layer 103 absorbs some undesirable portion of the spectrum. Absorption may be undesirable if the light is to be transmitted. In this instance, the buffer layer 103 may be approximately optically neutral. Thus, the buffer layer 103 may not absorb UV light or any such absorption may be minimized.

In an embodiment, the buffer layer 103 can be alumina. Alumina provides good optical properties with acceptable thermal properties. Alumina in thin film form is transparent to about 210 nm. Below 210 nm, alumina becomes absorbing with a refractive index of approximately 1.7 in the DUV. Alumina has a CTE of approximately $8 \times 10^{-6}/°$ C. but this can vary with deposition conditions and composition.

In an embodiment, the buffer layer 103 can be silicon oxynitride or aluminum oxynitride. Silicon oxynitride or aluminum oxynitride can be adjusted to vary the CTE. For example, the CTE for silicon oxynitride may be between approximately $5 \times 10^{-7}/°$ C. (the CTE of silica) and approximately $3 \times 10^{-6}/°$ C. (the CTE of silicon nitride). To compare optical properties, the refractive index of silica is about 1.5 in DUV and silicon nitride is about 2.2.

In an embodiment, the buffer layer 103 can be a mixture of materials, such as, a fluoride compound and an oxide compound. The fluoride compound can be $CaF_2$, LiF, $MgF_2$, $AlF_3$, or other metal fluorides. For example, a mixture of $SiO_2$ and $MgF_2$ can be used as a buffer layer 103. In this example, the $SiO_2$ and $MgF_2$ are co-evaporated. A mixture of materials in the buffer layer 103 can have intermediate CTE properties. $MgF_2$ is transparent to 120 nm and has a CTE (polycrystalline) of approximately $1 \times 10^{-5}/°$ C.

Besides being a mixture of materials, the buffer layer 103 can include distinct layers of the materials. This is described with respect to FIG. 4.

The buffer layer 103 has a thickness 105 of at least 0.5 μm. For example, the buffer layer 103 can have a thickness 105 of at least 1 μm. In another example, the buffer layer 103 has a thickness 105 from 2 μm to 4 μm, including all ranges and values therebetween. The thickness 105 of the buffer layer 103 could be greater than 4 μm, but an optimal thickness depends on the stress level (CTE mismatch). The optimal thickness of the buffer layer 103 can be determined by, for example, finite element modelling or similar mechanical models.

A thickness 105 of at least 0.5 μm may enable the buffer layer 103 to reduce the gradient of the stress between CTE1 and CTE2. If the thickness 105 is too small, then the buffer layer 103 will be unable to prevent damage caused by the difference in CTE between the substrate 101 and optical layer 102.

Figure 2:
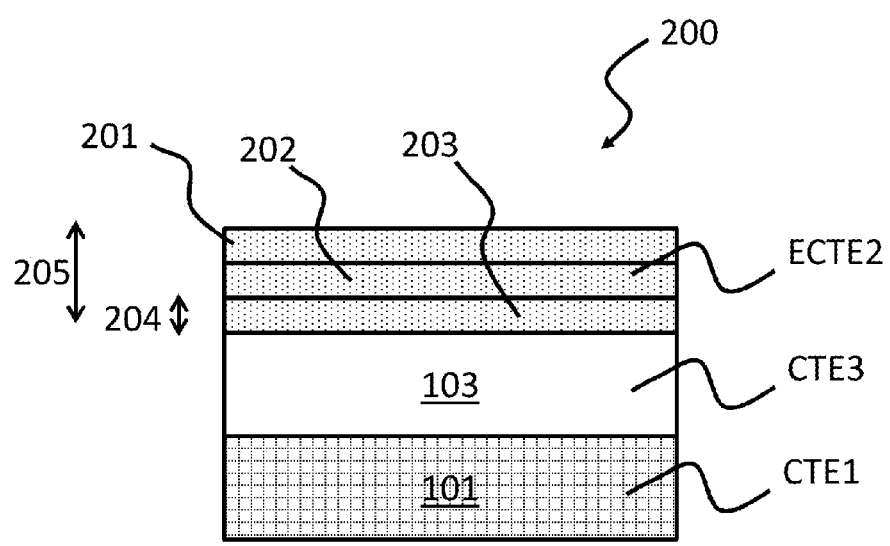
FIG. 2 is a block diagram of a second embodiment of a multilayer coating in accordance with the present disclosure.

FIG. 2 is a block diagram of a second embodiment of a multilayer coating 200. The buffer layer 103 is disposed between the substrate 101 and optical layers 201-203. While three optical layers 201-203 are illustrated, fewer or more than three optical layers are possible. The optical layers 201-203 may be different materials or mixtures of materials.

The second CTE for the optical layers 201-203 may be an effective coefficient of thermal expansion (ECTE2). The thickness of each of the optical layers 201-203 can affect the ECTE2.

In the embodiment of FIG. 2, at least one of the optical layers 201-203 has a thickness 204 greater than 0.5 μm. The thickness 204 is illustrated for optical layer 203, but can apply to other optical layers. The layers 201-203 have an overall thickness 205 of at least 1 μm. In an instance, the thickness 205 is multiple microns thick.

Figure 3:
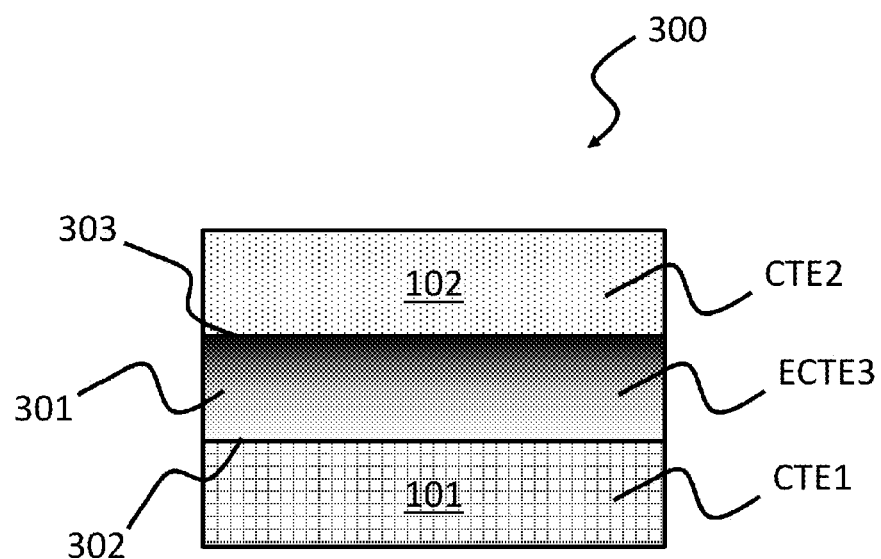
FIG. 3 is a block diagram of a third embodiment of a multilayer coating in accordance with the present disclosure.

FIG. 3 is a block diagram of a third embodiment of a multilayer coating 300. The buffer layer 301 is disposed between the substrate 101 and optical layer 102. This buffer layer 301 has a gradient of a first material and a second material (represented by the shading in FIG. 3). The first and second materials may be, for example, $CaF_2$ and alumina. A surface 302 of the buffer layer 301 disposed on the substrate 101 has more of the first material than the second material. A surface 303 of the buffer layer 301 disposed on the optical layer 102 has more of the second material than the first material. The gradient in the embodiment of FIG. 3 is illustrated as being continuous, but also can be stepped.

In one instance, the first material has a CTE closer to CTE1 than that of the second material and the second material has a CTE closer to CTE2 than that of the first material. The first and second material may have different refractive indices.

Figure 4:
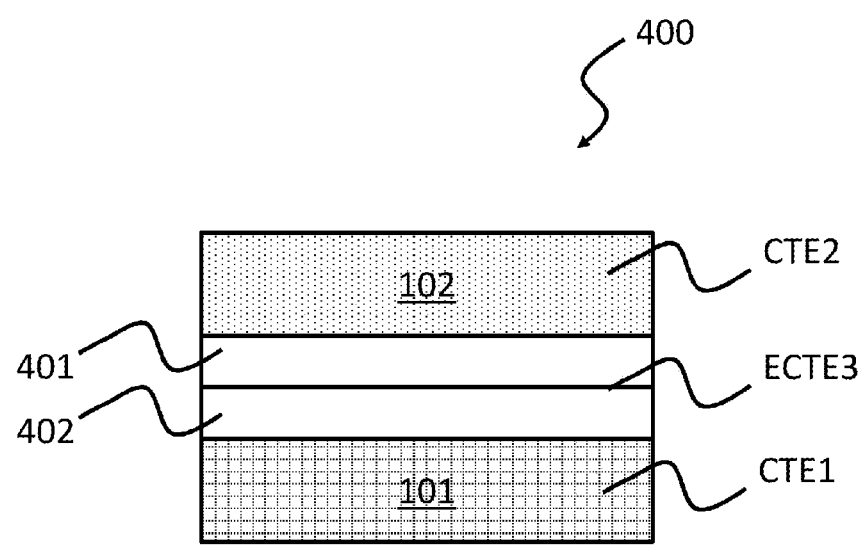
FIG. 4 is a block diagram of a fourth embodiment of a multilayer coating in accordance with the present disclosure.

FIG. 4 is a block diagram of a fourth embodiment of a multilayer coating 400. The buffer layer includes layers 401, 402 disposed between the substrate 101 and optical layer 102. The layers 401, 402 are different materials, which provides an effective third coefficient of thermal expansion (ECTE3). The thickness of each of the layers 401, 402 can affect the ECTE3.

In an example, the first layer 401 and the second layer 402 include varying thicknesses of $CaF_2$ and fused silica or another form of $SiO_2$. The optical layer 102 may be $CaF_2$ and the substrate 101 may be fused silica. In the example of FIG. 4, the second layer 402 includes 100 nm $CaF_2$ and 10 nm $SiO_2$ and the first layer 401 includes 10 nm $CaF_2$ and 100 nm $SiO_2$.

While only two layers 401, 402 are illustrated in FIG. 4, more than two layers may be used. Between 2 and 500 layers of varying thicknesses or ratios may be used, including all values and ranges therebetween. For example, the buffer layer can include three or more layers.

Figure 5:
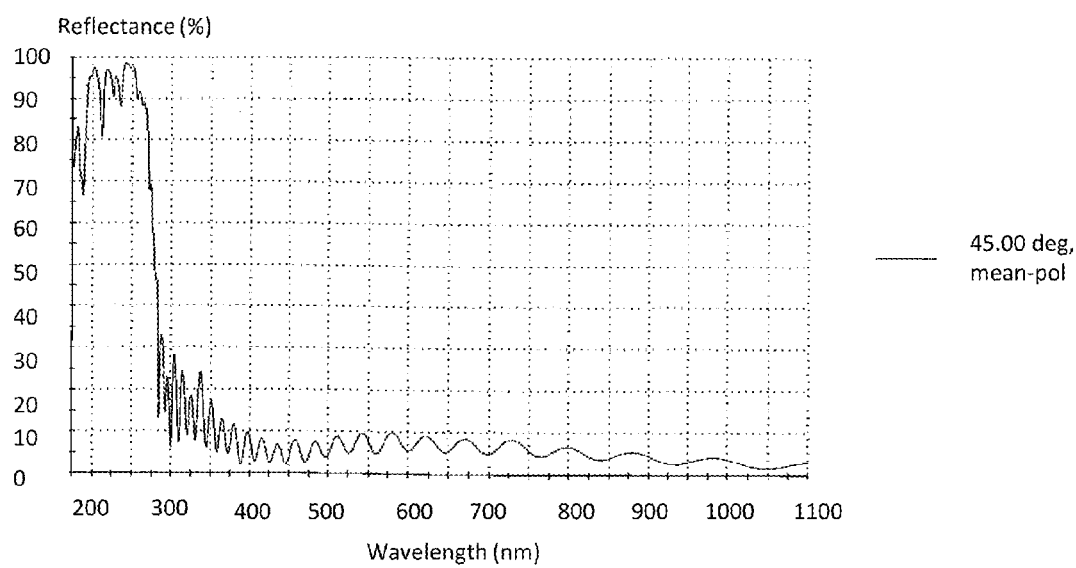
FIG. 5 is a chart comparing percent reflectance versus wavelength for a cold mirror without a buffer layer.

FIG. 5 is a chart comparing percent reflectance versus wavelength for a cold mirror without a buffer layer. As seen in FIG. 5, wavelengths from approximately 200 nm to less than 300 nm are primarily reflected. Greater than 90% reflectance is possible in these wavelengths.

Figure 6:
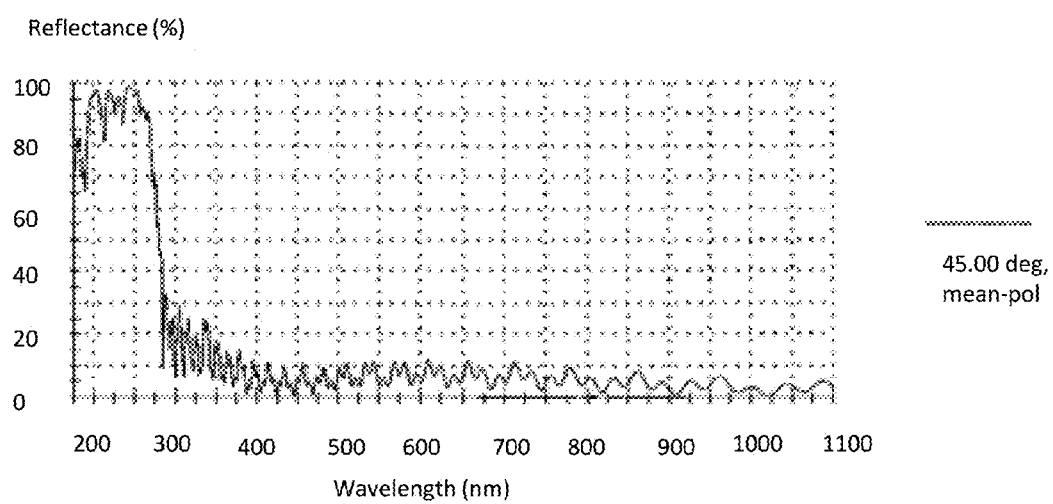
FIG. 6 is a chart comparing percent reflectance versus wavelength for a cold mirror with a buffer layer.

FIG. 6 is a chart comparing percent reflectance versus wavelength for a cold mirror with a buffer layer. When compared to FIG. 5, the multilayer coating with a buffer layer of FIG. 6 has a minimal effect on optical function. As seen in FIG. 6, wavelengths from approximately 200 nm to less than 300 nm are primarily reflected. Greater than 90% reflectance is possible in these wavelengths. Besides thermal stability and lifetime benefits, the multilayer coating with a buffer layer of FIG. 6 provides increased ripple compared to the cold mirror of FIG. 5. Layers can be added to reduce ripples via an effective index matching approach.

Use of the buffer layer disclosed herein can compensate for mismatches in a CTE between the substrate and optical layer of two orders of magnitude or more. For example, the difference between CTE1 and CTE2 may be a factor of 100. In an instance, the CTE mismatch may be between approximately $5 \times 10^{-7}/°$ C. for $SiO_2$ and approximately $2.5 \times 10^{-5}/°$ C. for Al.

Embodiments of the multilayer coating disclosed herein can be used in a multilayer mirror for DUV. Embodiments of the multilayer coating disclosed herein also can be used in an edge filter for DUV. Optical transmission properties of the various layers may be selected to filter only desired wavelengths of UV light.

Some components used in DUV optical imaging operate in heated or elevated temperature environments. For example, a multilayer mirror or edge filter may be used in environments of 350° C. or more. Such temperatures can introduce stress in the multilayer coating due to the differences in the CTE of the various layers. However, by use of the buffer layer as disclosed herein, thermal expansion is managed and damage to the multilayer coating is minimized or avoided.

Figure 7:
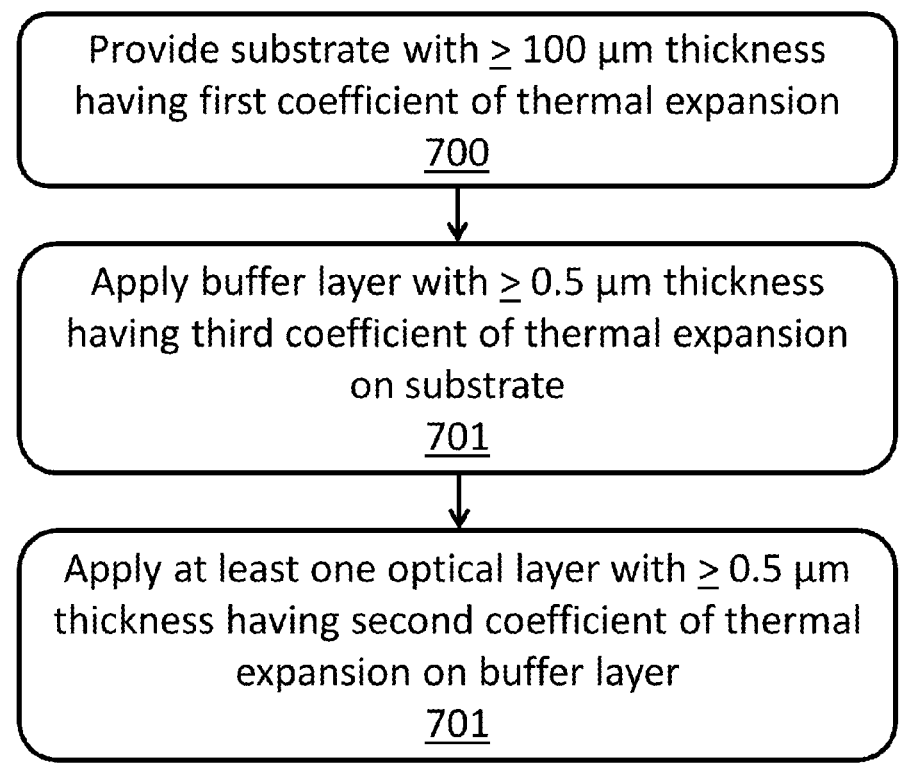
FIG. 7 is a flowchart of an embodiment of making a multilayer coating in accordance with the present disclosure.

FIG. 7 is a flowchart of an embodiment of making a multilayer coating. In 700, a substrate having a thickness of at least 100 μm and a first CTE is provided. In 701, a buffer layer having a third CTE and a thickness of at least 0.5 μm is applied on the substrate. In 702, at least one optical layer having a second CTE and a thickness of at least 0.5 μm is applied on the buffer layer. The third CTE has a value between the first CTE and the second CTE.

While single layers are described with respect to FIG. 7, multiple buffer layers or optical layers are possible. Multiple buffer layers or multiple optical layers provide an effective CTE.

The optical layer and buffer layer can be applied using methods known to those skilled in the art. For example, the optical layer and buffer layer can be applied using evaporation, sputtering, ion plating, or chemical vapor deposition.

Example 1

An alumina buffer layer is disposed between a fused silica substrate and a fluoride optical coating. This design can be used for reflective optics (multilayer mirrors) or for transmissive filters if the transmitting region is longer in wavelength than the absorption edge of the alumina (approximately 205 nm). This can result in ripples in the transmissive regions.

Example 2

A buffer layer with a gradient of materials is provided. The buffer layer has a thickness of approximately 4 μm. The first 1 μm of buffer layer disposed on the substrate contains approximately 80% material of the substrate and 20% material of the optical layer. The second 1 μm of buffer layer contains approximately 60% material of the substrate and 40% material of the optical layer. The third 1 μm of buffer layer contains approximately 40% material of the substrate and 60% material of the optical layer. The fourth 1 μm of buffer layer disposed on the optical layer contains approximately 20% material of the substrate and 80% material of the optical layer.

Example 3

The buffer layer includes thin layers of two materials with different coefficients of thermal expansion. One material has a higher CTE than the other, but the refractive indices in DUV may be relatively equal. The thickness ratio of the two layers can determine an effective CTE for the buffer layer. In one example, the buffer layer includes a layer of $CaF_2$ and a layer of $SiO_2$. Formation of the layer of $CaF_2$ and layer of $SiO_2$ is controlled to minimize interactions between the two layers.

Example 4

A buffer layer is formed using co-evaporation or sputtering of two materials. The materials can have similar CTEs or similar refractive indices. As the buffer layer is initially produced on the substrate, a first material with a CTE close to that of the substrate is primarily formed. As the thickness of the buffer layer increase, the percentage of the second material increases. Thus, the region of the buffer layer that will be disposed on the optical layer is primarily a second material with a CTE close to that of the optical layer. The gradient that is formed in the buffer layer can be continuous or stepped.

A gradient refractive index, gradient CTE buffer layer can be formed. The index matching may be desired for matching a second bulk material if the refractive index gradient is quintic. For matching a thin film multilayer, the effective refractive index of the multilayer may be matched.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A multilayer coating comprising:
a substrate having a first coefficient of thermal expansion, wherein a thickness of the substrate is at least 100 μm;
at least one optical layer having a second coefficient of thermal expansion, wherein a thickness of the optical layer is at least 0.5 μm; and
a buffer layer disposed between the substrate and the optical layer, wherein the buffer layer has a third coefficient of thermal expansion having a value between the first coefficient of thermal expansion and the second coefficient of thermal expansion, wherein a thickness of the buffer layer is from 2 μm to 4 μm, wherein the buffer layer comprises a gradient of a first material and a second material such that a percentage of the second material increases with thickness of the buffer layer from the substrate to the optical layer, and wherein a surface of the buffer layer disposed on the substrate has more of the first material than the second material and a surface of the buffer layer disposed on the optical layer has more of the second material than the first material.

2. The multilayer coating of claim 1, wherein the third coefficient of thermal expansion is greater than the first coefficient of thermal expansion and less than the second coefficient of thermal expansion.

3. The multilayer coating of claim 1, wherein the third coefficient of thermal expansion is less than the first coefficient of thermal expansion and greater than the second coefficient of thermal expansion.

4. The multilayer coating of claim 1, wherein the optical layer comprises a plurality of layers and wherein the second coefficient of thermal expansion is an effective coefficient of thermal expansion.

5. The multilayer coating of claim 4, wherein a thickness of at least one of the layers of the optical layer is greater than 0.5 μm.

6. The multilayer coating of claim 1, wherein the substrate includes one of a fluoride compound or fused silica.

7. The multilayer coating of claim 1, wherein the optical layer includes a fluoride compound.

8. The multilayer coating of claim 1, wherein the buffer layer includes one of alumina, silicon oxynitride, or aluminum oxynitride.

9. The multilayer coating of claim 1, wherein the buffer layer includes $SiO_2$ and at least one of $MgF_2$, LiF, $AlF_3$, or $CaF_2$.

10. The multilayer coating of claim 1, wherein the first material is a fluoride compound and the second material is fused silica.

11. The multilayer coating of claim 1, wherein the first material has a coefficient of thermal expansion closer to the first coefficient of thermal expansion than that of the second material, and wherein the second material has a coefficient of thermal expansion closer to the second coefficient of thermal expansion than that of the first material.

12. The multilayer coating of claim 11, wherein the first material and second material have different refractive indices.

13. The multilayer coating of claim 1, wherein the multilayer coating is used as a multilayer mirror for deep ultraviolet.

14. The multilayer coating of claim 1, wherein the multilayer coating is used as an edge filter for deep ultraviolet.

15. The multilayer coating of claim 1, wherein the gradient is continuous.

16. The multilayer coating of claim 1, wherein the gradient is stepped.

17. The multilayer coating of claim 1, wherein the first material is material of the substrate and the second material is material of the optical layer, wherein a first 1 μm of the buffer layer disposed on the substrate contains the first material at 80% and the second material at 20%, wherein a second 1 μm of buffer layer disposed on the first 1 μm of buffer layer contains the first material at 60% and the second material at 40%, wherein a third 1 μm of buffer layer disposed on the second 1 μm of buffer layer contains the first material at 40% and the second material at 60%, and wherein a fourth 1 μm of buffer layer disposed on the optical layer contains the first material at 20% and the second material at 80%.

18. A method of manufacturing a multilayer coating comprising:

providing a substrate having a first coefficient of thermal expansion, wherein a thickness of the substrate is at least 100 μm;

applying a buffer layer on the substrate, wherein the buffer layer has a third coefficient of thermal expansion and a thickness of the buffer layer is from 2 μm to 4 μm; and applying an optical layer on the buffer layer, the optical layer having a second coefficient of thermal expansion and a thickness of the optical layer is at least 0.5 μm;

wherein the third coefficient of thermal expansion has a value between the first coefficient of thermal expansion and the second coefficient of thermal expansion, wherein the buffer layer comprises a gradient of a first material and a second material such that a percentage of the second material increases with thickness of the buffer layer from the substrate to the optical layer, and wherein a surface of the buffer layer disposed on the substrate has more of the first material than the second material and a surface of the buffer layer disposed on the optical layer has more of the second material than the first material.

19. The method of claim 18, wherein the optical layer comprises a plurality of layers, and wherein the second coefficient of thermal expansion is an effective coefficient of thermal expansion.

* * * * *